United States Patent
Agarwal et al.

(10) Patent No.: US 11,481,940 B2
(45) Date of Patent: Oct. 25, 2022

(54) STRUCTURAL FACIAL MODIFICATIONS IN IMAGES

(71) Applicant: ADOBE INC., San Jose, CA (US)

(72) Inventors: Rekha Agarwal, Noida (IN); Sunil Rawat, NIT Faridabad (IN); Rishu Aggarwal, Rohini (IN); Ajay Bedi, Hamirpur (IN)

(73) Assignee: ADOBE INC., San Jose, CA (US)

( * ) Notice: Subject to any disclaimer, the term of this patent is extended or adjusted under 35 U.S.C. 154(b) by 557 days.

(21) Appl. No.: 16/376,905

(22) Filed: Apr. 5, 2019

(65) Prior Publication Data
US 2020/0320761 A1    Oct. 8, 2020

(51) Int. Cl.
| | |
|---|---|
| *G06T 11/60* | (2006.01) |
| *G06T 17/20* | (2006.01) |
| *G06T 11/00* | (2006.01) |
| *G06T 5/00* | (2006.01) |
| *G06V 40/16* | (2022.01) |

(52) U.S. Cl.
CPC ............ *G06T 11/60* (2013.01); *G06T 5/009* (2013.01); *G06T 11/001* (2013.01); *G06T 17/205* (2013.01); *G06V 40/161* (2022.01); *G06V 40/171* (2022.01)

(58) Field of Classification Search
CPC combination set(s) only.
See application file for complete search history.

(56) References Cited

U.S. PATENT DOCUMENTS

| | | | | |
|---|---|---|---|---|
| 7,027,054 B1* | 4/2006 | Cheiky | ................... | G06T 13/40 345/473 |
| 8,265,351 B2* | 9/2012 | Aarabi | ............... | G06K 9/00234 382/118 |
| 8,620,038 B2* | 12/2013 | Aarabi | .................... | G06T 11/60 382/118 |
| 8,660,319 B2* | 2/2014 | Aarabi | ............... | G06K 9/00228 382/100 |
| 9,491,263 B2* | 11/2016 | Gadot | ..................... | H04L 67/42 |
| 9,799,099 B2* | 10/2017 | Yang | ...................... | G06T 5/001 |
| 9,978,119 B2* | 5/2018 | Kim | .................. | G06K 9/00281 |
| 2002/0015514 A1* | 2/2002 | Kinjo | ................. | G06K 9/00221 382/118 |

(Continued)

*Primary Examiner* — Motilewa Good-Johnson
(74) *Attorney, Agent, or Firm* — Shook, Hardy & Bacon LLP (57) ABSTRACT

Structural modifications to a person's face in a reference image are captured and automatically applied to the person's face in another image. The reference image is processed to compute landmark information on the person's face and apply a mesh to the reference image. When structural modifications are made to the person's face in the reference image, the mesh is modified, and the modified mesh is stored in association with the landmark information. Another image is analyzed to compute landmark information on the person's face in that image and apply a mesh to the image. A transformation matrix is computed using the landmark information from the reference image and current image, and the modified mesh from the reference image is transformed using the transformation matrix. The mesh in the current image is modified using the transformed mesh, thereby applying the structural modification to the person's face in the current image.

7 Claims, 9 Drawing Sheets

(56) References Cited

U.S. PATENT DOCUMENTS

2014/0043329 A1* 2/2014 Wang ................. G06T 17/20
345/420
2017/0061685 A1* 3/2017 Auclair ............... A63F 13/00
2018/0268207 A1* 9/2018 Kim ................... G06T 13/40

* cited by examiner

STRUCTURAL FACIAL MODIFICATIONS IN IMAGES

BACKGROUND

Image editing tools are available that allow users to enhance various aspects of images, such as brightness, lighting, contrast, saturation, and the like. Some current image editing tools also allow users to structurally modify portions of a person's face in an image. For instance, some common structural modifications made by users include widening of eyes, thinning/thickening of eyebrows/lips/cheeks, and restructuring of nose or ears, to name a few. Such structural facial modifications are often made by users when sharing images on social media platforms. Some users consistently make a particular structural modification to their face each time an image is shared. Current image editing tools require a user to make the same structural modification to a face in each image. To get the correct result, a user has to spend significant effort to make the same structural modification every time the user shares another image.

SUMMARY

Embodiments of the present invention relate to, among other things, an image editing tool that captures a structural modification to a person's face in an initial image (i.e., reference image) and automatically applies the structural modification to the person's face in other images. To capture a structural modification of a face in a reference image, the image editing tool analyzes the reference image to detect the face and compute landmark information on the face. A mesh is applied to the reference image that divides the reference image into blocks. User input structurally modifying the person's face in the reference image is received and applied to the mesh to modify the mesh. The landmark information and modified mesh from the reference image are stored and used when applying the structural modification to the person's face in another image.

To apply the captured structural modification, the image editing tool accesses another image and analyzes the image to detect the person's face and compute landmark information on the face in the image. Facial recognition is also performed to determine the person's face in the current image matches the person's face in the reference image. A mesh is applied to the current image dividing the current image into blocks. Additionally, the image editing tool computes a transformation matrix using the landmark information from the reference image and the landmark information in the current image to account for difference in orientation of the person's face between the two images. The transformation matrix is applied to the modified mesh from the reference image to generate a transformed mesh. The mesh in the current image is then modified using the transformed mesh, causing pixels in the current image to be modified and thereby applying the structural modification to the person's face in the current image.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

With the proliferation of digital cameras and social media, users capture and share a large number of images. Nearly all social media platforms, such as the FACEBOOK, WHATSAPP, INSTAGRAM, SNAPCHAT, WECHAT, and TWITTER platforms, allow users to share images with other users. Often, the images include the user and/or other people. "Selfies," in particular, have become deeply rooted with the typical social media user.

Users often want to "look their best" in images, especially when sharing the images on social media platforms. A number of image editing tools have been developed that allow users to modify images. Conventional image editing tools can apply a variety of different types of modifications to images. These modifications can generally be classified as either "structural" or "non-structural" modifications.

Structural modifications include any change that affects the structure of a person's face. This includes any change to the size and/or location of a facial feature. More particularly, a structural modification could increase the size of (i.e., thicken), decrease the size of (i.e., thin), and/or move portions of a facial feature. A facial feature could include, for instance, a person's nose, eyes, lips, eyebrows, ears, jaw line, and hair line, to name a few.

Non-structural modifications include any change to an image that does not affect the structure of a person's face. A non-structural modification may affect the person's face but doesn't change the structure of the face. Such non-structural modifications could include, for instance, brightness, lighting, contrast, saturation, spot healing, cloning, shadow highlighting, and red eye correction, to name a few.

While some conventional image editing tools can automatically apply non-structural modifications (e.g., auto-enhance features), they do not provide for automatically applying structural modifications. As such, whenever a user wishes to structurally modify a person's face in an image, the user must manually do so. There are some users who repeatedly modify a particular feature of their face each time they upload an image. For example, a person may feel that her lips are not full enough. As such, the person may employ an image editing tool to thicken her lips each time she shares an image. This can be a very time-consuming and repetitive task.

One of the challenges associated with structurally modifying a person's face is that the orientation of a face is generally inconsistent from image to image. For instance, a face may be tilted to the left or right, tilted forward or backward, and/or rotated to the left or right. Accounting for such different orientations in image presents a challenge.

Embodiments of the present invention are directed to an image editing tool that resolves these challenges by providing a solution for automatically applying structural facial modifications to images. At a high level, the image editing tool initially captures structurally modifications a user makes to a person's face in an initial or "reference image" and then automatically applies those structural modifications to the person's face in other images. Continuing the example above in which a person wishes to thicken her lips in images, the person can use the image editing tool described herein to access an initial picture with the person's face and structurally modify the face to thicken her lips. The image editing tool captures those structural modifications and can then automatically apply the structural modifications to other images of the person to thicken her lips in those images.

In accordance with the technology described herein, the image editing tool captures and applies structural modifications relative to the position of landmark information on faces in images. Landmark information generally comprises information identifying salient points or portions of a face. For instance, the landmark information can represent the location of distinctive features in a face, such as portions of the eyes, eyebrows, ears, nose, mouth, jawline, and/or hair line. By capturing and applying structural modifications relative to landmark information on a person's face in images, the structural modifications can be consistently applied to the person's face across images regardless of the orientation of the person's face in the images.

To capture a structural modification, the image editing tool accesses an initial or reference image with a person's face. The reference image is analyzed to detect the face and compute landmark information on the face. A unique facial ID is generated from the analysis that can subsequently be used when automatically applying structural modifications. A mesh is also applied to the reference image that divides the image into blocks (e.g., rectangular blocks of 8×8 pixels, although other shapes and sizes can be used). When the image editing tool receives user input structurally modifying the person's face in the reference image, blocks of the mesh in the area of the structural modification are modified. The modified mesh is stored in association with the unique facial ID.

To automatically apply the captured structural modification, the image editing tool accesses another image of the person's face. The current image is analyzed to detect the face and compute landmark information on the face. Facial recognition is performed to identify the person's face in the current image as corresponding to the person's face in the references image, and the unique facial ID for that face is retrieved based on the facial recognition. A mesh is applied to the current image, dividing the current image into blocks. A transformation matrix is generated using the landmark information from the reference image and the landmark information from the current image. This accounts for the difference in orientation of the person's face between the two images. The transformation matrix is then applied to the modified mesh from the reference image to provide a transformed mesh. The mesh in the current image is then modified using the transformed mesh. This modifies certain blocks in the mesh of the current image, thereby modifying pixels of the current image corresponding with those blocks and, in doing so, applying the structural modification to the person's face in the current image.

Example Image Editing System Providing Structural Facial Modification

Figure 1:
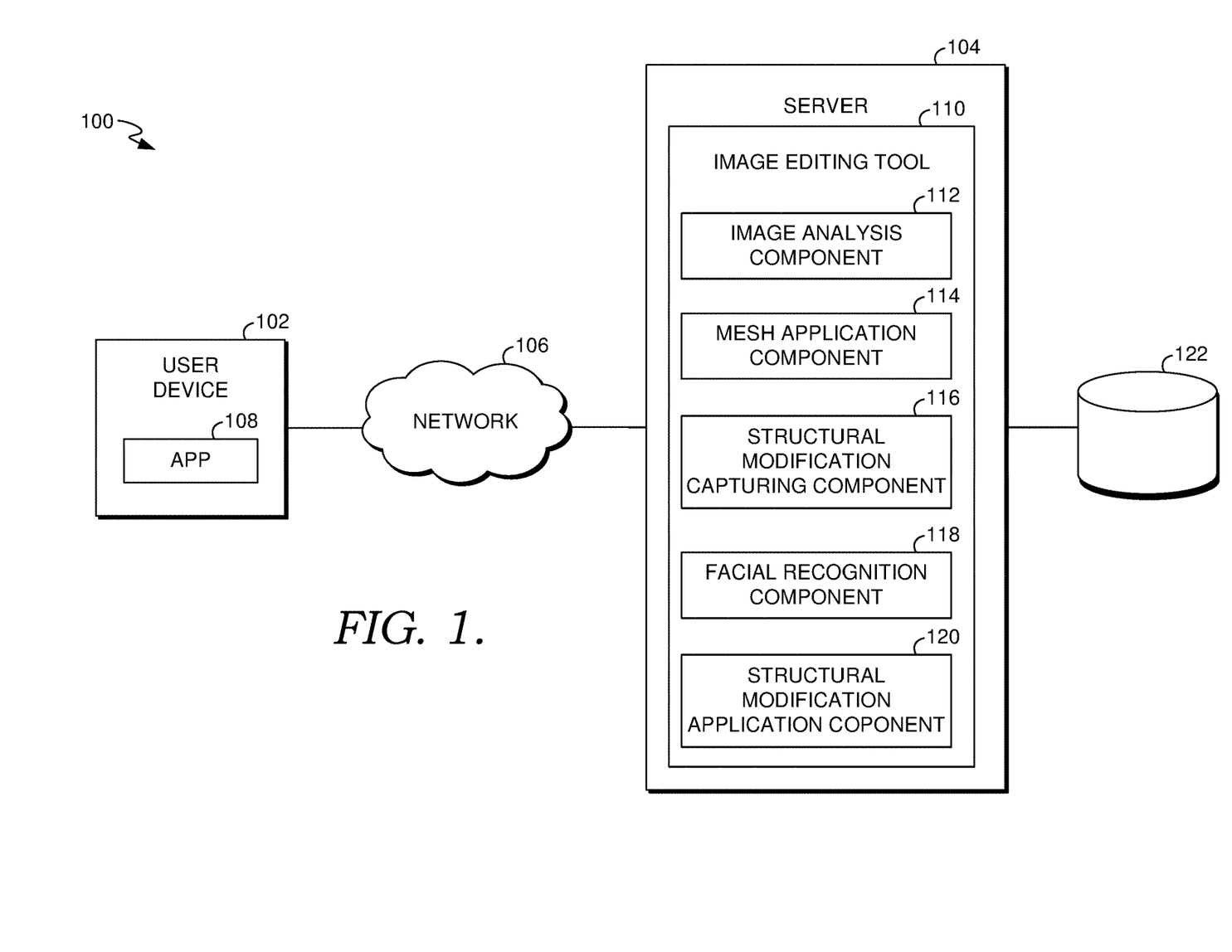
FIG. 1 is a block diagram illustrating an exemplary system in accordance with some implementations of the present disclosure.

With reference now to the drawings, FIG. 1 is a block diagram illustrating an exemplary system for capturing structural modifications to a person's face in a reference image and automatically applying those structural modifications to the person's face in other images in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102 interacting with an image editing tool 110 hosted by a server 104. Each of the user device 102 and server 104 shown in FIG. 1 can comprise one or more computer devices, such as the computing device 700 of FIG. 7, discussed below. As shown in FIG. 1, the user device 102 and the server 104 can communicate via a network 106, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100 within the scope of the present invention. Each may comprise a single device or multiple devices cooperating in a distributed environment. For instance, the server 104 could be provided by multiple server devices collectively providing the functionality of the image editing tool 110 as described herein. Additionally, other components not shown may also be included within the network environment.

The user device 102 can be any type of computing device, such as, for instance, a personal computer (PC), tablet computer, desktop computer, mobile device, or any other suitable device having one or more processors. As shown in FIG. 1, the user device 102 includes an application 108 for interacting with the image editing tool 110 on the server 104. The application 108 can be, for instance, a web browser or a dedicated application for providing image editing functions, such as those described herein.

At a high level, the image editing tool 110 includes components to capture structural modifications to a person's face made in a reference image and automatically apply those structural modifications to the person's face in other images. As shown in FIG. 1, the components of the image editing tool 110 include an image analysis component 112, mesh application component 114, structural modification capturing component 116, facial recognition component 118, and structural modification application component 120. These components may be in addition to other components that provide further image editing features beyond the structural modification features described herein. For instance, the image editing tool 110 could be the PHOTOSHOP or LIGHTROOM application developed by Adobe Inc.

The image editing tool 110 can be implemented using one or more server devices (such as the server 104), one or more platforms with corresponding application programming interfaces, cloud infrastructure, and the like. While the image editing tool 110 is shown on a server 104 separate from the user device 102 in the configuration of FIG. 1, it should be understood that in other configurations, some or all of the functions of the image editing tool 110 can be provided on the user device 102. In some configurations, the server 104 is not necessary as all image editing functions are provided locally on the user device 102.

In operation, the image editing tool 110 initially captures structural modifications made to a person's face in a reference image. To do so, the image analysis component 112 accesses an initial image with a person's face. This initial image is referred to herein as a "reference image." For instance, the image editing tool 110 may provide a user interface that allows the user to select an image that includes one or more faces to which structural modifications will be applied by the user and captured by the image editing tool 110. This could be a stored image or an image captured using a camera on the user device 102 in response to a prompt from the user interface.

The image analysis component 112 analyzes the reference image to detect any faces. In some instances, the reference image includes only a single face, and the image analysis component 112 detects the face. In other instances, the reference image includes multiple faces, and the image analysis component 112 may detect each of the faces. In some embodiments, when multiple faces are detected, the image analysis component 112 further analyzes each of the faces detected. In other embodiments, when multiple faces are detected, any number of the faces can be further analyzed. For instance, a user interface displaying the image may prompt the user to specify which face(s) for further processing.

The image analysis component 112 computes landmark information for each face being processed in the reference image. The landmark information generally comprises information identifying salient points or portions of the face. Typically, the landmark information represents the location of distinctive features in the face, such as portions of the eyes, eyebrows, ears, nose, mouth, jawline, and/or hair line. The landmark information could include, for instance, a vector of points with the points located in a coordinate system. The coordinate system could be defined relative to a particular point of the reference image (e.g., the upper left-hand corner of the reference image) or relative to a particular point in the landmark information. In some configurations, the image analysis component 112 can use any of a number of available solutions for landmark identification, such as, for instance, the Dlib library, the CLM-framework library, or the Facemark API. A unique facial ID is generated from the image analysis of each face and stored in the data store 122. The unique facial ID for a face includes, among other things, the landmark information computed for the face.

The mesh application component 114 applies a mesh to the reference image. The mesh divides the reference into smaller blocks. For instance, in one configuration, the mesh divides the reference image into rectangular blocks of 8×8 pixels. However, it should be understood that the mesh could be comprised of blocks using other geometric shapes (e.g., triangles) and/or other sizes. The mesh can be applied to the entire reference image or only a portion of the image. As an example of the latter, the mesh could be applied to an area, such as a bounding box, around a face in the reference image. Each block in the mesh can have a set of coordinates, defining the shape, size, and location of the block. The coordinates of a block can be located, for instance, relative to a particular point in the reference image (e.g., the upper left-hand corner of the reference image) or a point associated with the landmark information.

The structural modification capturing component 116 generally operates to capture structural modifications made to a person's face in the reference image. In instances in which the reference image includes multiple faces, the structural modification capturing component 116 can capture structural modification made to each of the faces (to the extent structural modifications are made to more than one face in the reference image).

To facilitate structural facial modifications to the reference image, a user interface may be provided that displays the reference image and allows the user to modify face(s) in the reference image. For instance, the Liquify tool in the PHOTOSHOP or LIGHTROOM applications or the clone stamp tool in the PHOTOSHOP application could be used to modify a person's face in the reference image. When the person's face is modified in the reference image, the mesh applied to the reference image is modified based on the user input. In particular, each block of the mesh in the area of a structural modification to the person's face is modified according to the changes made to underlying pixels in the reference image. This could include moving the position of blocks and/or changing the shape and size of blocks, which results in changes to the coordinates of the affected blocks.

The modified mesh is saved in association with the unique facial ID for the person's face. This may include saving the modified mesh relative to the landmark information, thereby allowing for positioning of blocks in the modified mesh to be identified relative to positioning of portions of the landmark information. This allows for the structural modification to the person's face (as captured by the modified mesh) to be located relative to the landmark information on the person's face.

Figure 2A:
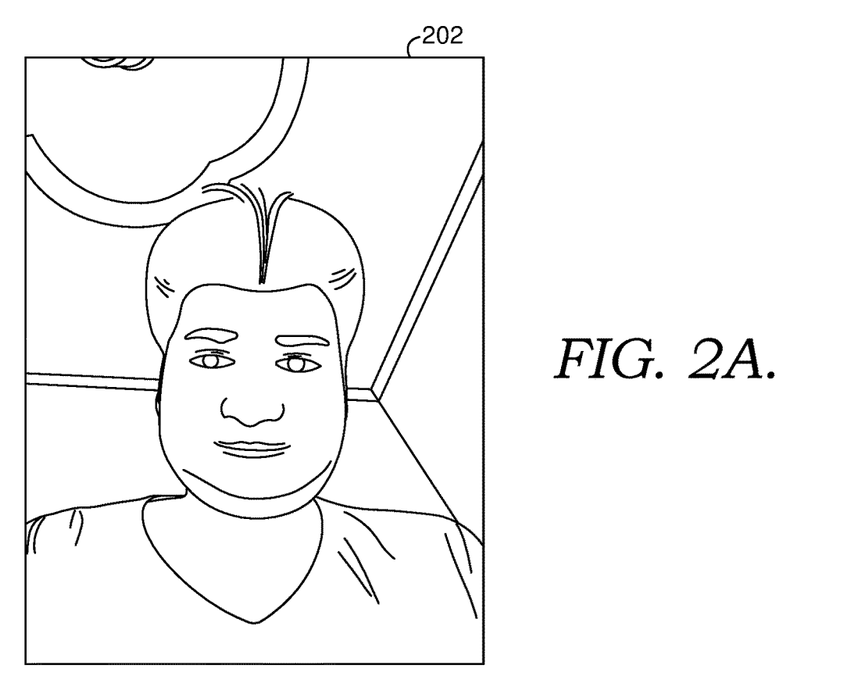
FIGS. 2A-2D are images depicting the processing of a reference image in order to capture structural modifications made to a face in the reference image.

By way of example to illustrate, FIGS. 2A-2D show the processing of a reference image 202 to capture structural modifications to a person's face in the reference image 202. As shown in FIG. 2A, an initial reference image 202 is accessed. This could be, for instance, an image the user captures using a camera on the user device 102 of FIG. 1 for the purpose of capturing structural modifications or it could simply be a stored image.

Figure 2B:
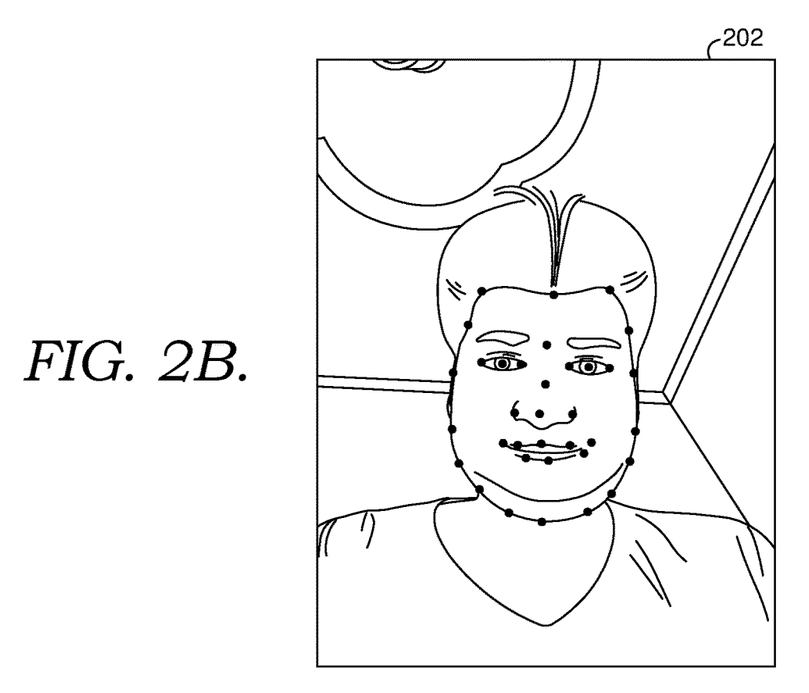

As shown in FIG. 2A, the reference image includes a single face. The reference image 202 is analyzed to detect the face and landmark information is generated, as shown in FIG. 2B. The landmark information includes points along the eyes, nose, lips, hairline, and jawline of the person's face. It should be understand that the points shown in FIG. 2B are provided by way of example only, and other landmark information may be generated in accordance with different configurations of the technology described herein.

Figure 2C:
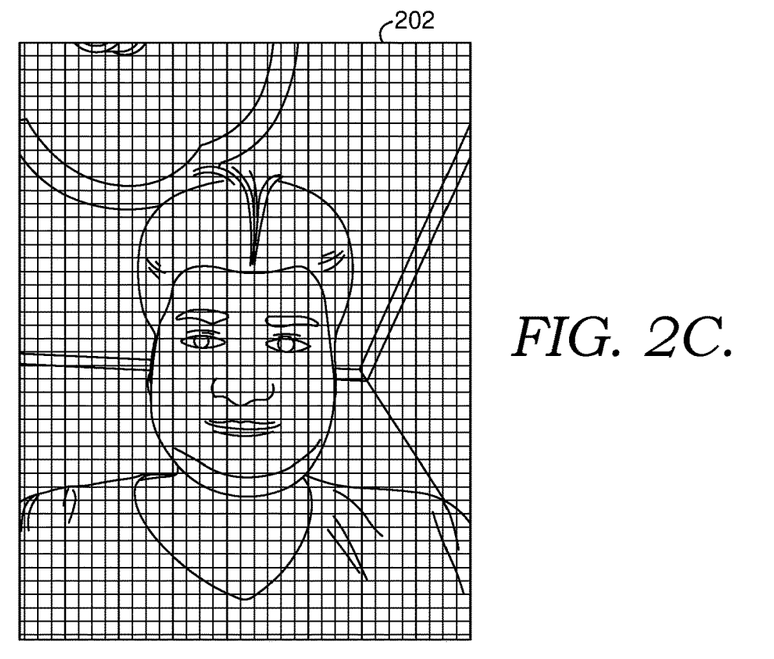

The application of a mesh to the reference image 202 is shown in FIG. 2C. The mesh has been applied to the entire reference image 202. However, it should be understood that in other configurations, the mesh could be applied to only a portion of the reference image 202 (e.g., an area around the detected face).

Figure 2D:
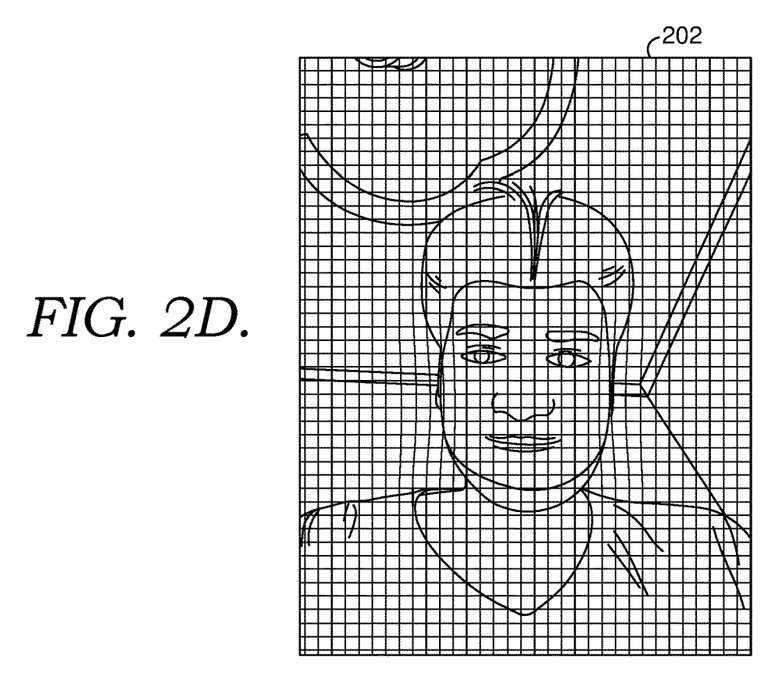

As shown in FIG. 2D, the user has modified the face in the reference image 202 by decreasing the width of the person's jawline on each side of the person's face. As can be seen, the blocks of the mesh in the area around the jawline have been modified based on the modification to the reference image. Because the jawline has been moved inwards, blocks around outside of the jawline have been moved inwards and/or extended, while blocks around the inside of the jawline have been correspondingly moved inwards and/or compressed. Blocks in other areas of the image have not been impacted.

Returning to FIG. 1, after capturing structural modifications made to a person's face in a reference image, the image editing tool 110 can automatically apply the structural modifications to other images of the person's face. To do so, the image editing tool 110 accesses a current image to be processed. For instance, the user may specify one or more images to which to apply structural modifications or the image editing tool 110 may automatically apply structural modifications to saved images.

For a current image being processed, the image analysis component 112 analyzes the image to detect a face (or multiple faces) and generates landmark information for the face (or multiple faces). Additionally, the mesh application component 114 applies a mesh to the current image. Both the analysis of the current image by the image analysis component 112 and the application of the mesh by the mesh application 114 component are done similar to the processing of the reference image discussed above.

The facial recognition component 118 identifies a detected face in the current image as corresponding to the person's face from the previously processed reference image. Existing facial recognition techniques can be employed to perform this analysis. The facial recognition allows for identifying the unique facial ID created for the person's face from the reference image stored in the data store 122. The landmark information and modified mesh associated with the unique facial ID are then used by the structural modification application component 120 to automatically modify the structure of the person's face in the current image.

To automatically apply structural modifications to the person's face in the current image, the structural modification application component 120 generates a transformation matrix based on the landmark information in the current image being processed and the landmark information from the reference image (i.e., retrieved from the unique facial ID). The transformation matrix represents the difference in positioning of landmark information between the two images. This reflects the difference in the orientation of the person's face between the two images.

The structural modification application component 120 applies the landmark transformation matrix to the modified mesh from the reference image to generate a transformed mesh. This transforms the modified mesh in a way that accounts for the difference in orientation of the person's face between the reference image and the current image. The mesh in the current image being processed is then modified using the transformed mesh. This may include modifying blocks of the mesh in the current image to match corresponding blocks of the transformed mesh. For instance, if a block in the transformed mesh has been stretched in a particular direction, the corresponding block in the mesh in the current image is stretched to the same extent. In modifying the mesh in the current image, pixels corresponding with modified blocks in the current image are modified. In this way, the structural modification is applied to the person's face in the image.

Figure 3A:
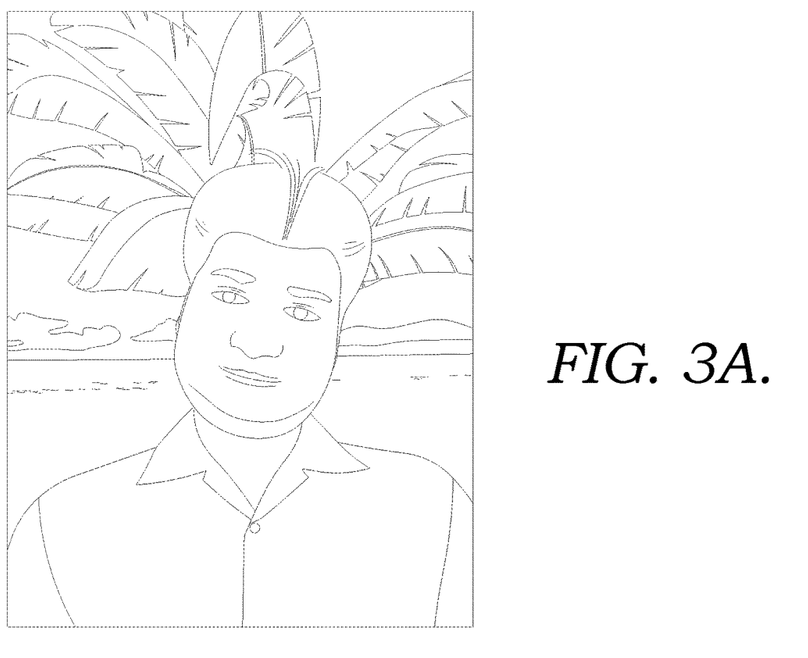
FIGS. 3A-3D are images depicting the processing of an image in order to automatically apply structural modifications to a face in the image.

By way of example to illustrate, FIGS. 3A-3D show the processing of an image 302 to automatically apply structural modifications to a person's face in the image 302. As shown in FIG. 3A, an image 302 is accessed. The image 302 includes the face of the same person in the image 202 discussed above with reference to FIGS. 2A-2D. As can be seen from a comparison of FIGS. 2A and 3A, the person's face is tilted to the viewer's right in the image 302 relative to the position of the person's face the image 202.

Figure 3B:
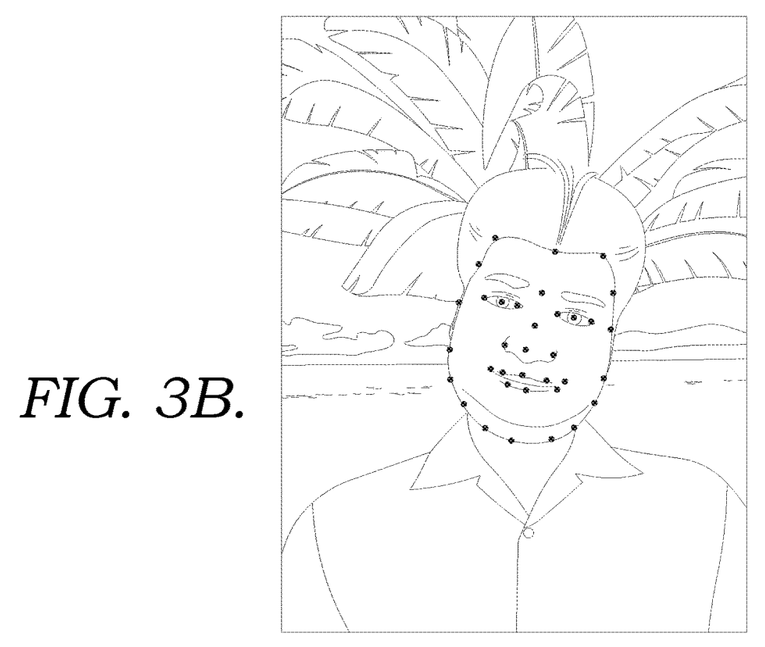

Similar to the discussion above for the image 202, the image 302 is analyzed to detect the face and landmark information is generated, as shown in FIG. 3B. The landmark information includes points along the eyes, nose, lips, hairline, and jawline of the person's face. It should be understood that the processing may identify other landmark information in different configurations.

Figure 3C:
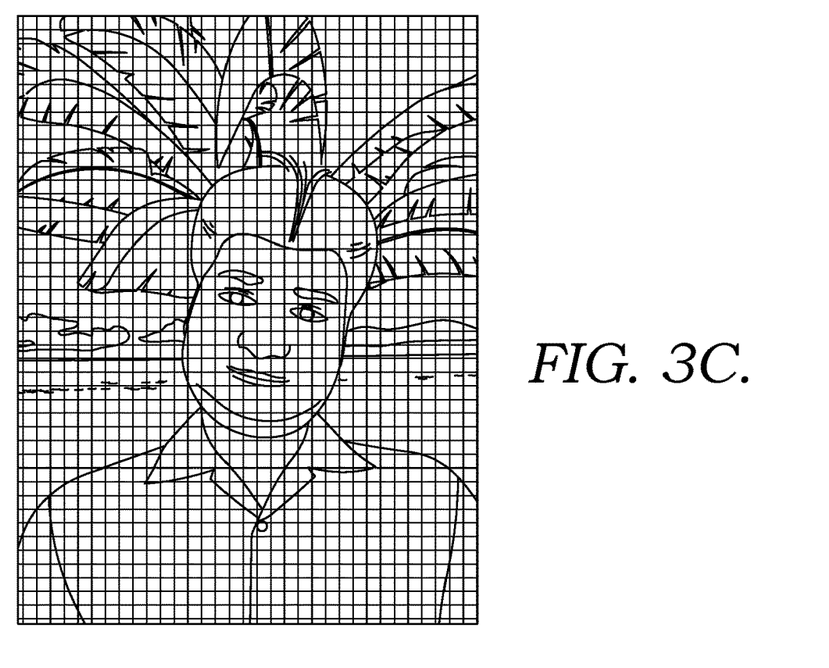

A mesh is applied to the image 302 as shown in FIG. 3C. Although the mesh has been applied to the entire image 302, it should be understood that in other configurations, the mesh could be applied to only a portion of the image 302 (e.g., an area around the detected face).

Figure 3D:
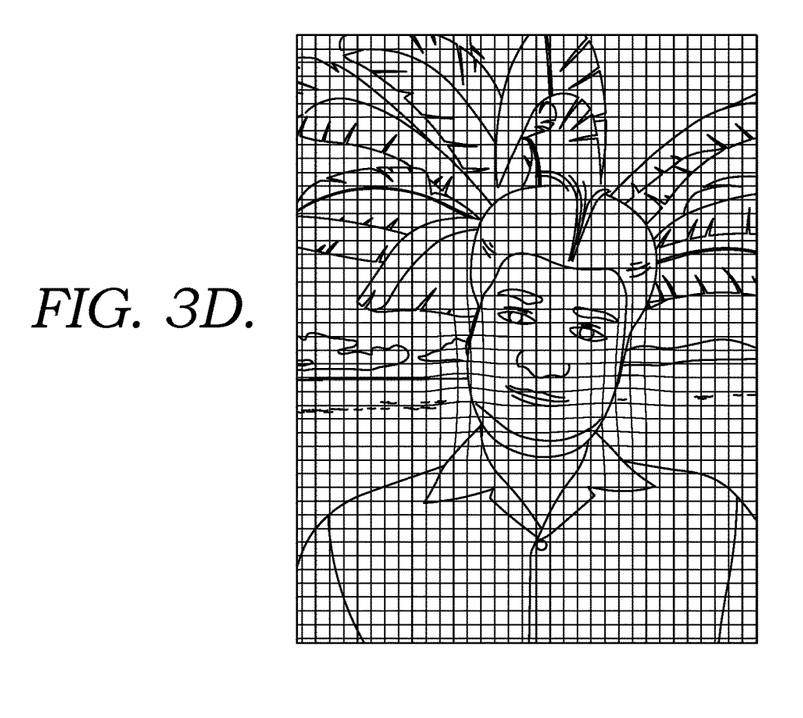

In FIG. 3D, the person's face has been structurally modified in the image 302 by automatically applying the structural modifications captured in FIGS. 2A-2D. As can be seen in FIG. 3D, the mesh in the image 302 has been modified. This results in structurally modifying the person's face by decreasing the width of the person's jawline on each side of the person's face.

Exemplary Flow Diagrams

Figure 4:
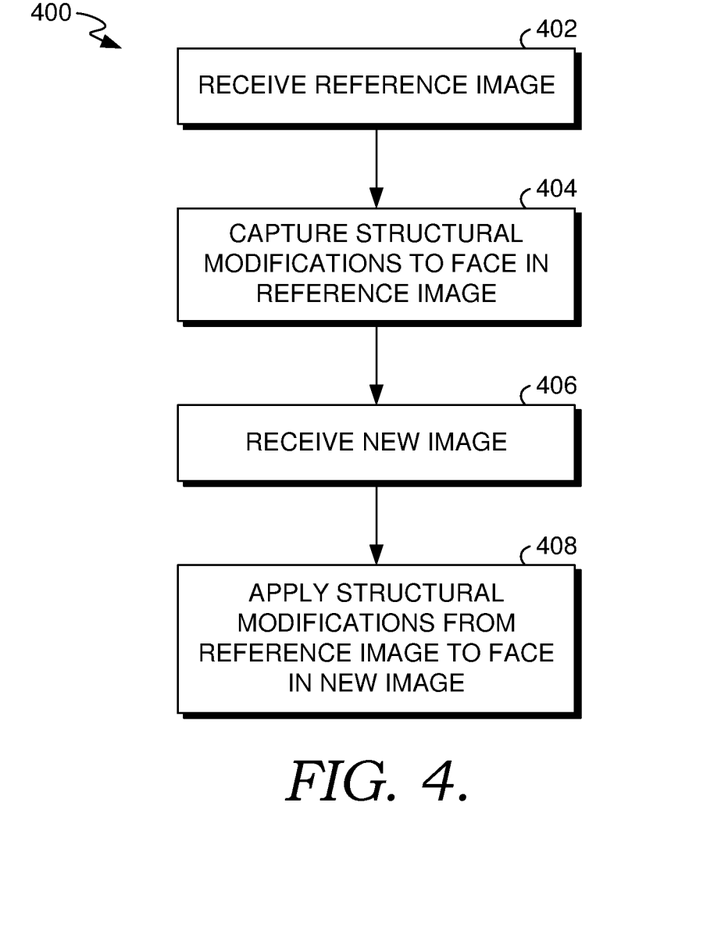
FIG. 4 is a flow diagram showing a method for capturing structural modifications made to a person's face in a reference image and automatically applying the structural modifications to the person's face in another image in accordance with some implementations of the present disclosure.

With reference now to FIG. 4, a flow diagram is provided that illustrates a method 400 for capturing structural modifications made to a person's face in a reference image and automatically applying the structural modifications to the person's face in another image. The method 400 may be performed, for instance, by image editing tool 110 of FIG. 1. Each block of the method 400 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 402, a reference image with a person's face is received. The reference image may be retrieved by prompting the user to capture an image with the person's face or retrieving a stored image. Structural modifications made to the person's face in the reference image by the user are captured, as shown at block 404. This could be done, for instance, according to the method 500 described below with reference to FIG. 5. For example, a user interface could be provided that displays the reference image and allows the user to structurally modify the person's face. Those structural modifications are captured and stored in order to automatically apply the structural modifications to the person's face in another image.

A new image with the person's face is received at block 406. This could be a stored image or an image recently captured by a camera on a user device. The structural modifications to the person's face captured from the reference image are applied to the person's face in the new image, as shown at block 408. This could be done, for instance, according to the method 600 described below with reference to FIG. 6. For example, a user interface could be provided that allows a user to select image(s) for automatically applying the structurally modifications. As another example, a user may capture (using a camera on the user device) or retrieve from storage an image with the person's face and a prompt may ask the user whether to automatically apply structural modifications to the person's face.

While FIG. 4 has been described in the context of capturing structural modifications to a single face in a reference image and applying structural modifications to a single face in a new image, it should be understood that the process can include capturing structural modifications to any number of faces in a reference image and/or applying structural modifications to any number of faces in a new image.

Figure 5:
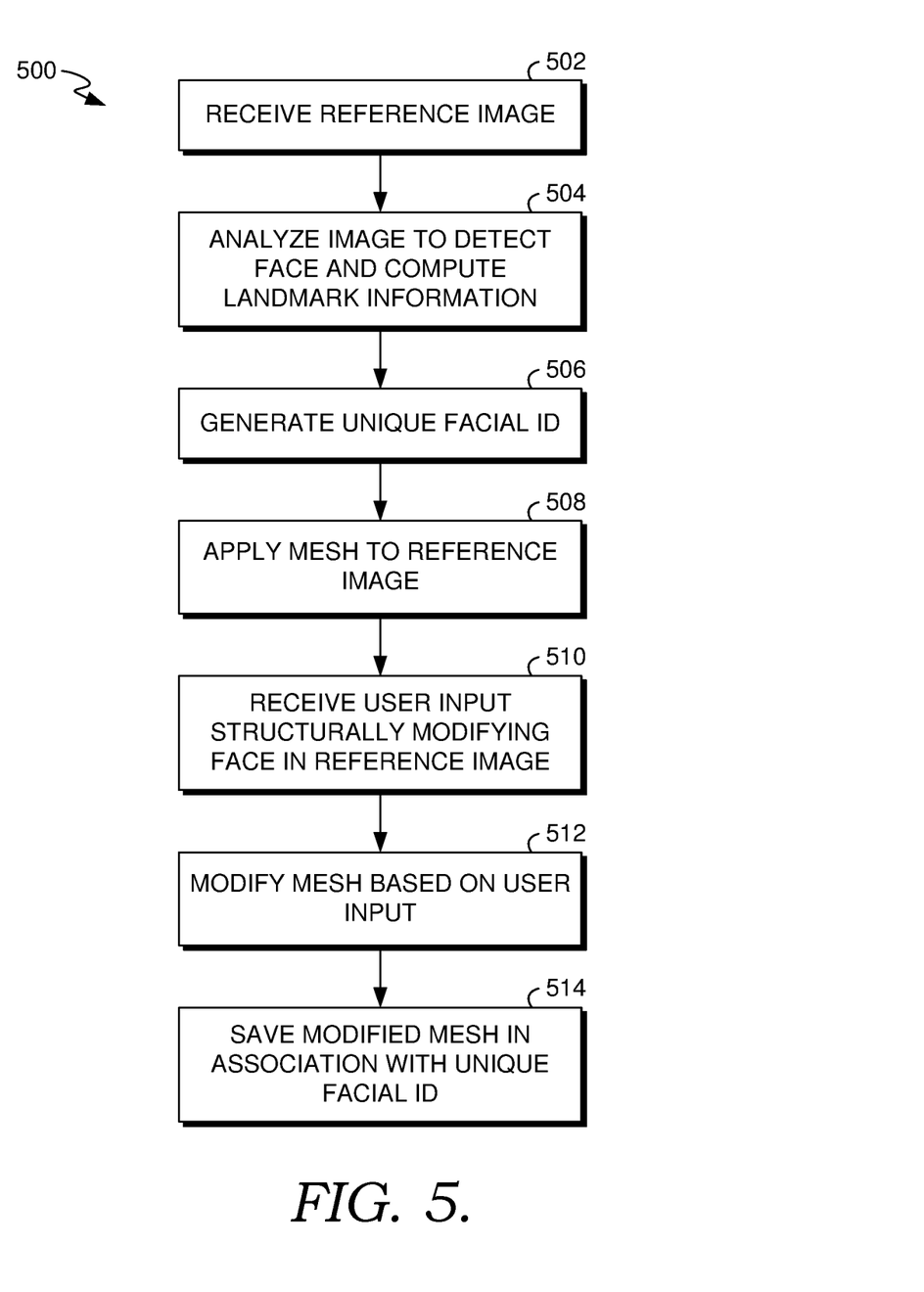
FIG. 5 is a flow diagram showing a method for capturing a structural modification to a person's face in a reference image for use in automatically applying the structural modification to the person's face in another image in accordance with some implementations of the present disclosure.

Turning next to FIG. 5, a flow diagram is provided showing a method 500 for capturing a structural modification to a person's face in a reference image for use in automatically applying the structural modification to the person's face in another image. The method 500 may be performed, for instance, by the image editing tool 110 of FIG. 1. As shown at block 502, a reference image is received that includes a person's face. The reference image can include any number of faces in any orientations. The process described herein will be discussed in the context of capturing structural modifications made to a single person's face in the reference image, but it should be understood that the process could be applied to any number of faces in the reference image.

The reference image is analyzed at block 504 to detect the person's face and to compute landmark information for the face. The landmark information may include, for instance, a vector of points identifying the locations of facial features, such as portions of the eyes, eyebrows, ears, nose, mouth, jawline, and/or hair line. The face may be detected and landmark information computed using any of a number of available solutions, such as, for instance, the Dlib library, the CLM-framework library, or the Facemark API.

A unique facial ID is created from the image analysis and stored, as shown at block 506. The unique facial ID includes information from the image analysis, including the landmark information for the detected face from the reference image.

As shown at block 508, a mesh is applied to the reference image that divides the reference image into smaller blocks. In some configurations, the mesh divides the reference image into rectangular blocks of 8×8 pixels. However, it should be understood that the mesh could divide the image into blocks with different shapes and/or sizes in various configurations. Additionally, the mesh can be applied to the entire reference image or only a portion of the reference image. The shape, size, and/or location of a block may be defined using coordinates within the reference image. The coordinates can be defined relative to a particular point, such as the upper left-hand corner of the reference image, or a point associated with the landmark information.

User input structurally modifying the person's face in the reference image is received at block 510. The mesh applied to the reference image is modified based on the user input, as shown at block 512. In particular, each block of the mesh in the area of a structural modification to the person's face is modified according to the modifications made to the person's face in the reference image. This could include moving the position of a block and/or changing the shape and size of the block.

As shown at block 514, the modified mesh is saved with respect to the landmark information for the reference image. This may include, for instance, mapping coordinates of blocks of the modified mesh to coordinates of the landmark information. This allows positions of blocks in the modified mesh to be identified relative to the landmark information. As such, when another image of the person's face is processed, the structural modifications applied in the reference image can be automatically applied to the person's face in the new image regardless of the orientation of the person's face in the new image.

Figure 6:
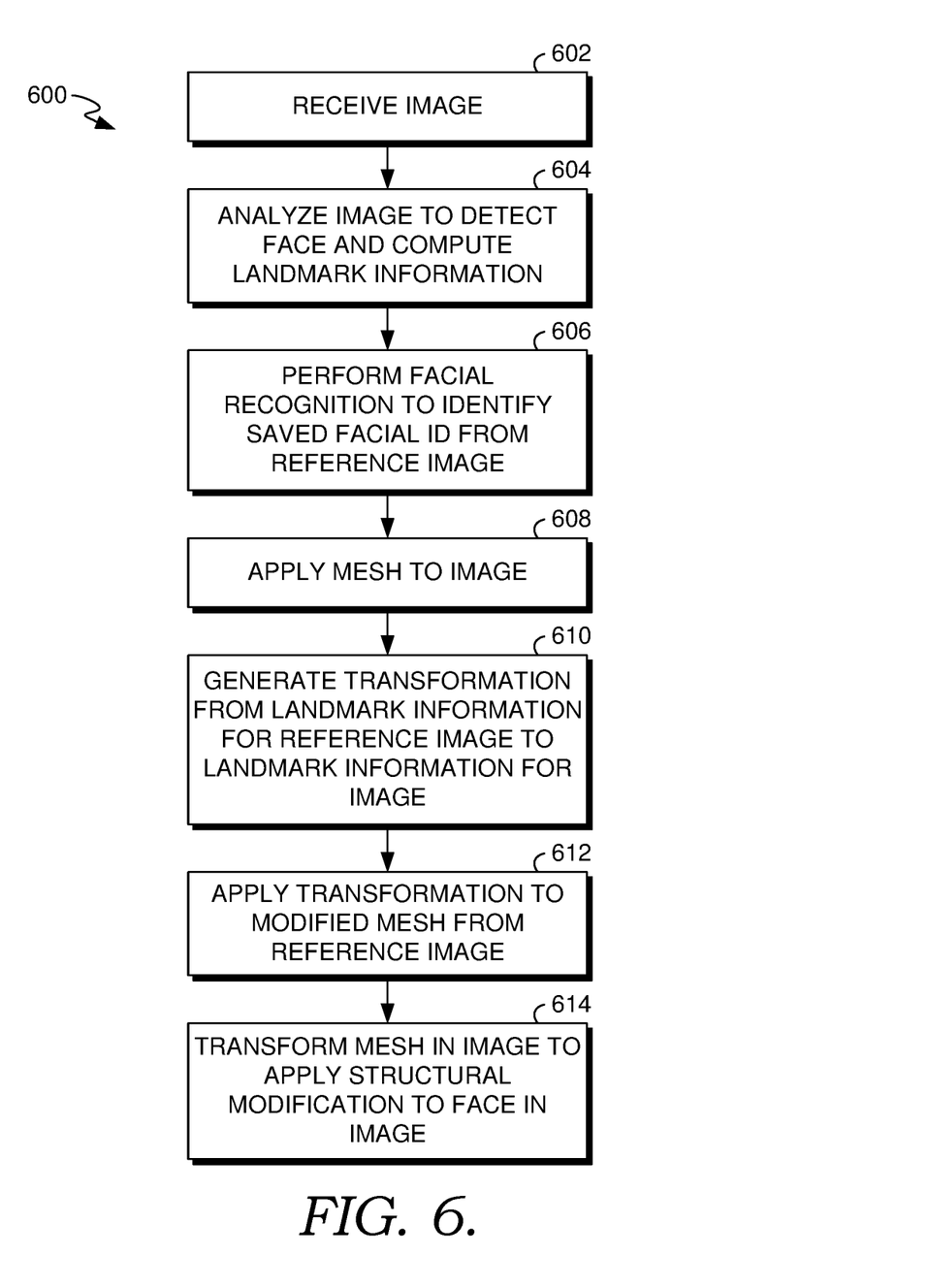
FIG. 6 is a flow diagram showing a method for automatically applying a structural modification to a person's face in an image in accordance with some implementations of the present disclosure.

With reference now to FIG. 6, a flow diagram is provided showing a method 600 for automatically applying a structural modification to a person's face in an image. The method 600 may be performed, for instance, by the image editing tool 110 of FIG. 1. As shown at block 602, an image with a person's face is received. This could be, for instance, a newly captured image that includes the person's face or a saved image that includes the person's face. The process described herein will be discussed in the context of automatically applying structuring changes made to a single person's face in the image, but it should be understood that the process could be applied to structurally modify any number of faces in the image.

The image is analyzed at block 604 to detect the person's face and to compute landmark information for the face. This may be done similar to the image analysis discussed above with reference to block 504 of FIG. 5. Facial recognition is performed to identify the person's face in the image as corresponding with the person's face in a reference image, and a unique facial ID generated from that reference image is identified. For instance, a unique facial ID could have been generated and stored for a number of different people, and the facial recognition identifies the unique facial ID for the person' in the image currently being processed.

As shown at block 608, a mesh is applied to the current image that divides the image into smaller blocks. This may be done similar to the application of the mesh to the reference image discussed above with reference to block 508 of FIG. 5.

Landmark information from the reference image is retrieved using the unique facial ID identified at block 606, and a transformation matrix is generated using the landmark information from the current image and the landmark information from the reference image, as shown at block 610. The transformation matrix is generated based on the difference of positioning of the landmark information between the reference image and the current image.

As shown at block 612, the modified mesh from the reference image is retrieved using the unique facial ID identified at block 606, and the transformation matrix generated at block 610 is applied to the modified mesh to generate a transformed mesh. The transformed mesh is then applied to the mesh in the current image, as shown at block 614. This causes the underlying pixels in the current image that are associated with the portions of the mesh that are transformed to be modified, thereby applying the structural modification from the reference image to the person's face in the current image.

Exemplary Operating Environment

Figure 7:
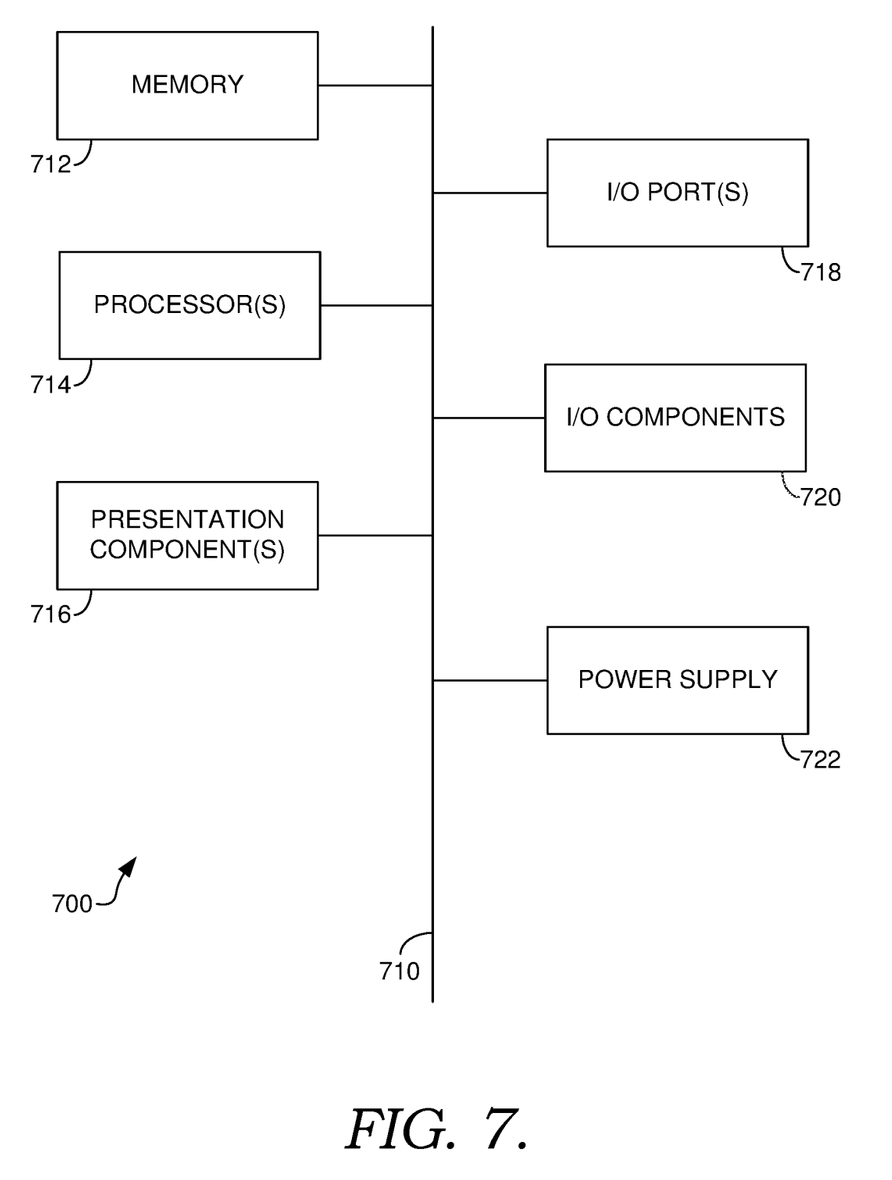
FIG. 7 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 700. The computing device 700 may be equipped with depth cameras, such as, stereoscopic camera systems, infrared camera systems, RGB camera systems, and combinations of these for gesture detection and recognition. Additionally, the computing device 700 may be equipped with accelerometers or gyroscopes that enable detection of motion.

As described above, implementations of the present disclosure relate to capturing structural modifications made to a person's face in a reference image and automatically applying the structural modification to the person's face in other images. The present invention has been described in relation to particular embodiments, which are intended in all respects to be illustrative rather than restrictive. Alternative embodiments will become apparent to those of ordinary skill in the art to which the present invention pertains without departing from its scope.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computerized method for image editing, the method comprising:
    analyzing a first image to detect a face in the first image and compute landmark information on the face in the first image;
    applying a mesh to the first image, the mesh dividing the first image into a plurality of blocks;
    modifying a portion of the blocks in the mesh in the first image to provide a modified mesh based on user input making a structural modification to the face in the first image;
    analyzing a second image to detect the face in the second image and compute landmark information on the face in the second image;
    applying a mesh to the second image, the mesh dividing the second image into a plurality of blocks;
    generating a transformation matrix using the landmark information from the first image and the landmark information from the second image;
    applying the transformation matrix to the modified mesh from the first image to generate a transformed mesh; and
    modifying the mesh in the second image using the transformed mesh to apply a structural modification to the face in the second image.

2. The computerized method of claim 1, the method further comprising:
    generating a unique facial ID that comprises the landmark information from the first image; and
    storing the unique facial ID.

3. The computerized method of claim 2, the method further comprising:
    storing at least a portion of the modified mesh from the first image in association with the unique facial ID.

4. The computerized method of claim 1, the method further comprising:
    performing facial recognition to identify the face in the first image as corresponding to the face in the second image.

5. The computerized method of claim 1, wherein each block from the plurality of blocks of the mesh in the first image and the plurality of blocks of the mesh in the second image comprises a rectangle of 8 by 8 pixels.

6. The computerized method of claim 1, the method further comprising:
    detecting a second face in the first image and computing landmark information on the second face in the first image; and
    modifying a second portion of the blocks in the mesh in the first image based on further user input making a structural modification to the second face in the first image.

7. The computerized method of claim 1, the method further comprising:
    detecting a second face in the second image and computing landmark information on the second face in the second image;
    generating a second transformation matrix using landmark information on the second face from a further image and the landmark information on the second face in the second image;
    applying the second transformation matrix to a second modified mesh from the further image to generate a second transformed mesh; and
    modifying the mesh in the second image using the second transformed mesh to apply a structural modification to the second face in the second image.

* * * * *